United States Patent [19]
Varma et al.

[11] 4,357,536
[45] Nov. 2, 1982

[54] APPARATUS AND METHOD FOR MONITORING THE INTENSITIES OF CHARGED PARTICLE BEAMS

[75] Inventors: Matesh N. Varma, Mt. Sinai; John W. Baum, Patchogue, both of N.Y.

[73] Assignee: The United States of America as represented by the United States Department of Energy, Washington, D.C.

[21] Appl. No.: 225,492

[22] Filed: Jan. 16, 1981

[51] Int. Cl.³ .......................... G01K 1/08; H01J 3/14; H01J 3/26
[52] U.S. Cl. .................................................. 250/397
[58] Field of Search ............... 250/396, 397, 423, 503, 250/514; 313/359, 361

[56] References Cited
U.S. PATENT DOCUMENTS
4,101,771 7/1978 Hofer et al. .
4,191,888 3/1980 Meadows .

OTHER PUBLICATIONS
"A Simple Heavy-Ion Beam Monitor", Varma, Nucl. Inst. and Methods, 133, (1976), pp. 205–207.

Primary Examiner—Bruce C. Anderson

[57] ABSTRACT

Charged particle beam monitoring means (40) are disposed in the path of a charged particle beam (44) in an experimental device (10). The monitoring means comprise a beam monitoring component (42) which is operable to prevent passage of a portion of beam (44), while concomitantly permitting passage of another portion thereof (46) for incidence in an experimental chamber (18), and providing a signal ($I_m$) indicative of the intensity of the beam portion which is not passed. Calibration means (36) are disposed in the experimental chamber in the path of the said another beam portion and are operable to provide a signal ($I_f$) indicative of the intensity thereof. Means (41 and 43) are provided to determine the ratio (R) between said signals whereby, after suitable calibration, the calibration means may be removed from the experimental chamber and the intensity of the said another beam portion determined by monitoring of the monitoring means signal, per se.

18 Claims, 3 Drawing Figures

APPARATUS AND METHOD FOR MONITORING THE INTENSITIES OF CHARGED PARTICLE BEAMS

BACKGROUND OF THE INVENTION

The United States Government has rights in this invention pursuant to Contract No. DE-AC02-76CH00016, between the United States Department of Energy and Associated Universities, Inc.

The present invention relates to new and improved apparatus and method for precisely monitoring the intensities of a wide range of charged particle beams over a wide range of beam energies.

Although a variety of apparatus and methods are known in the prior art for the monitoring of the intensities of charged particle beams, it may be understood that many of the same are somewhat limited in application and/or exhibit significant operational disadvantages. Thus, and taking for example physics experiments wherein a charged particle beam is directed into a gas-filled experimental chamber operated at pressures above a few tenths of milliTorr, the conventional prior art apparatus and method of monitoring beam intensity through use of a Faraday cup, or thin foil, upon which the beam is incident, and which outputs a current proportional in magnitude to beam intensity, cannot be used effectively due to: scattering of the charged particles, for example charged ions, by the gas in the experimental chamber; uncertainties regarding the effective charge of the ions; ionization produced in the Faraday cup; energy loss of the ionic beam in transiting the gas-filled chamber for incidence on the Faraday cup; and/or loss of secondary electrons by secondary electron emission from the Faraday cup.

Alternatively, and taking for example prior art beam intensity monitoring apparatus and methods such as those disclosed in the paper A SIMPLE HEAVY ION BEAM MONITOR by M. N. Varma, Ph.D., Nuclear Instruments And Methods (133) (1976) 205–207, which operate on the principle of secondary electron emission from one or more very thin foils upon which the beam to be monitored is incident and through which the same must pass prior to entry into the experimental chamber, it will be understood by those skilled in this art that although such prior art apparatus and method do not require a Faraday cup, except for calibration purposes, and are thus suitable for use in physics experiments of the nature discussed hereinabove, reliance thereby for operation upon the principles of secondary electron emission can and does nonetheless give rise to significant operational disadvantages. More specifically, since very thin, and accordingly particularly fragile, foils are required to insure that the relatively low energy heavy beam is not completely stopped thereby, structural degradation of the foils can readily occur through corrosion and/or handling damage or the like and ultimately result in change in the secondary electron emission coefficient of the foils and attendant decrease in beam intensity monitoring accuracy. Deposition of stray molecules on the respective foil surfaces can also ultimately result in change in the secondary electron emission coefficient of the foils. Too, and particularly for use with beams of relatively low energy heavy ions, the requirement of the prior art apparatus and method under discussion that the beam pass through the foils can result in the loss of too large a fraction of the beam energy, and/or can spread out the beam energies to such an extent that it becomes most difficult if not impossible to accurately specify the energy of the beam upon entry thereof into the experimental chamber. In addition, reliance as described upon the principle of secondary electron emission for beam intensity monitoring can result in change of the charge on the ion beam to thus render most elusive exact knowledge of the charge of the incident ions in the experimental chamber. In addition, reliance upon the principle of secondary electron emission for charged particle beam intensity monitoring is, of course, unduly limitative of the nature of the charged particle beams which can be appropriately monitored in accordance therewith. It may thus, in summary in this regard, be understood that reliance upon the principle of secondary electron emission for charged particle beam monitoring, in addition to being somewhat limitative with regard to appropriate beam monitoring applications, clearly introduces a number of not insignificant uncertainties into the beam intensity monitoring procedure.

SUMMARY OF THE INVENTION

It is, accordingly, an object of this invention to provide new and improved apparatus and method for precisely monitoring the intensities of charged particle beams.

Another object of this invention is the provision of apparatus and method as above which are applicable to the monitoring of the intensities of beams of a wide variety of charged particles, and over a wide beam energy range.

Another object of this invention is the provision of apparatus and method as above which, once suitably calibrated, are constant in time with regard to the continuing accuracy of the beam intensity monitoring results over long time periods.

Another objects of this invention is the provision of apparatus and method as above which are operable substantially without energy loss in the charged particle beam being monitored.

Another object of this invention is the provision of apparatus and method as above which are applicable to charged particle beam intensity monitoring attendant a wide variety of charged particle beam applications.

Another object of this invention is the provision of apparatus as above which are of relatively uncomplicated configuration, and which require the use of only relatively low cost, readily available state-of-the-art components of proven dependability in the fabrication thereof.

Another object of this invention is the provision of apparatus and method as above which are particularly, though by no means exclusively, adapted to the monitoring of the intensity of a beam of relatively low energy heavy ions attendant usage therof in the conduct of physics experiments for the determination of basic physical properties.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention, as embodied and broadly described therein, the apparatus of this invention may comprise charged particle beam intensity monitoring means which are disposable in the path of a charged particle beam and are operable to prevent the passage of a cross-sectional portion of the beam while concomitantly passing, without change, another cross-section portion of the beam and providing a signal proportional in magnitude to the intensity of the beam portion which is not passed by the monitoring means. Calibration of the beam monitoring means is achieved by calibration means which are operable, in response to the incidence thereon of said passed beam portion, to provide a signal proportional in magnitude to the intensity thereof; whereby, once the ratio between said signals is determined, monitoring of the magnitude of the monitoring means signal, per se, may be utilized to determine the intensity of the charged particle beam. (The phrase "cross-sectional portion" is used herein to indicate that the intensity monitoring means of the subject invention subtends a portion of the solid angle subtended by the beam; stopping a portion of the beam cross-section while allowing the remaining portion to pass unaffected. Other references to "portions of the beam" herein are to be understood as referring to such "cross-sectional portions".)

Preferably, the beam monitoring means comprise a monitoring component including a disc or other appropriately configured structure of a suitable material such as tantalum having a beam passage aperture formed therein.

In a further aspect of the present invention, in accordance with its objects and purposes, the method of the invention may comprise the steps of disposing beam intensity monitoring means in the path of a charged particle beam to prevent passage of a portion of the beam while concomitantly passing another portion of the beam and providing a signal proportional in magnitude to the intensity of the beam portion which is not passed by the monitoring means. Calibration is achieved by the steps of disposing calibration means, which are operable to provide a signal proportional in magnitude to the intensity of a charged particle beam incident thereon, in the path of said passed beam portion; whereby, once the ratio between said signals has been determined, monitoring of the magnitude of the monitoring means signal, per se, may be utilized to determine the intensity of the charged particle beam.

BRIEF DESCRIPTION OF THE DRAWINGS

The accompanying drawings, which are incorporated in and form part of this specification, illustrate a preferred embodiment of the present invention and, together with the description, serve to explain the teachings of the invention. In the drawings.

DETAILED DESCRIPTION OF THE INVENTION

Figure 1:
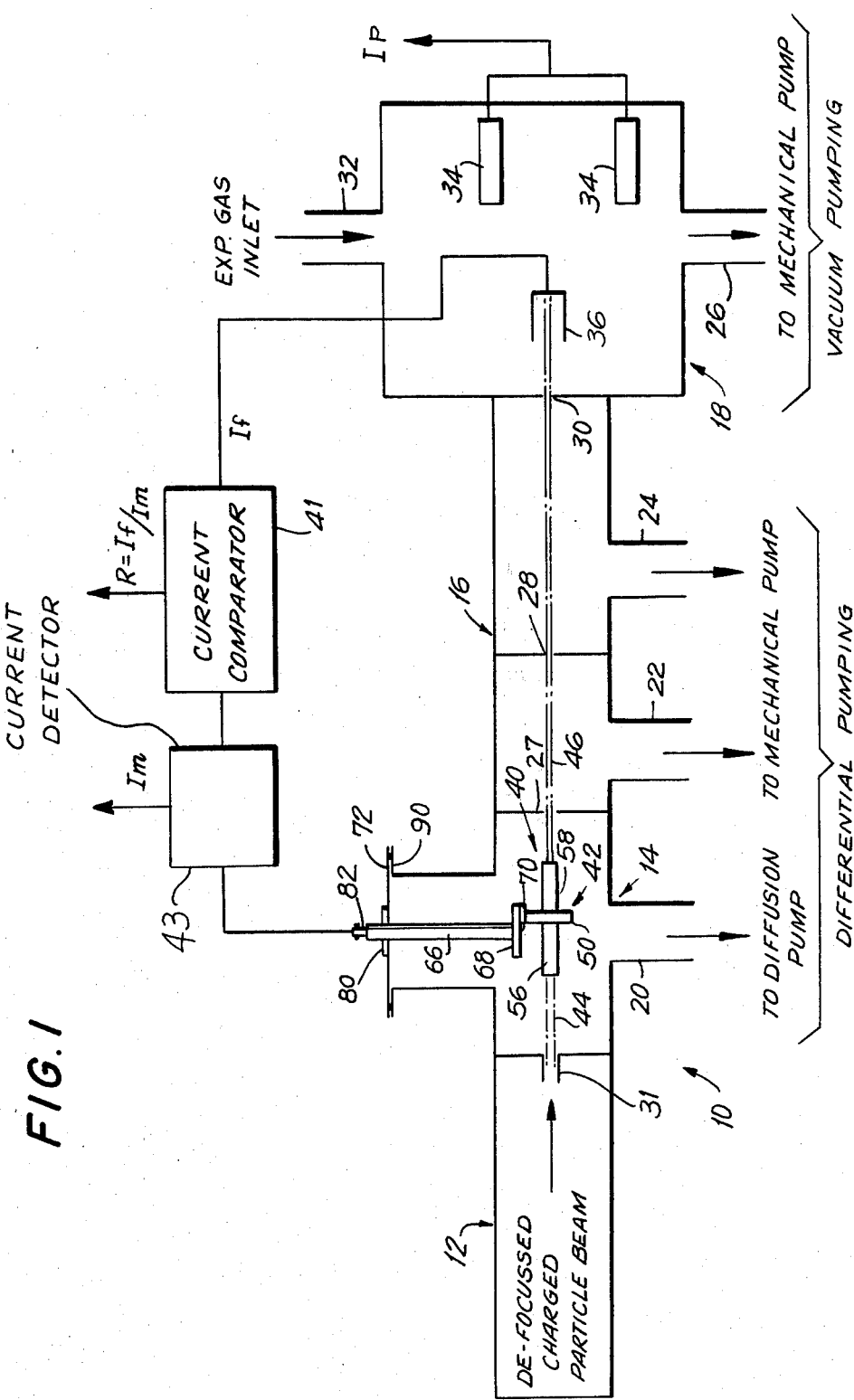
FIG. 1 is a generally schematic view of an experimental device illustrating a representative utilization of a preferred embodiment of the beam monitoring apparatus and method of the invention.

Referring now in detail to FIG. 1 of the drawings which illustrates a representative utilization of a preferred embodiment of the apparatus and method of this invention, an experimental device, utilizable, for example, for a variety of physics experiments wherein charged particle beams taking, for example, the form of beams of low energy heavy ions are employed for the particularly accurate determination of basic physical quantities, is indicated generally at 10 and does not, per se, form part of this invention.

The experimental device 10 comprises a charged particle beam pipe as indicated generally at 12, a beam intensity monitoring section as indicated generally at 14, a differential pumping section as indicated generally at 16, and a variable pressure experimental ionization chamber as indicated generally at 18, all of which are interconnected as shown to form a structurally integral and, of course, particularly vacuum-tight assembly. Differential and vacuum pumping outlets are indicated at 20, 22, 24 and 26, and are respectively connected as indicated in FIG. 1 to appropriate differential and vacuum pumping means (not shown) for the maintenance of predetermined pressure differentials within the experimental device 10 as specified in greater detail hereinbelow. Differential pumping apertures, as indicated at 27, 28 and 30, are also provided to this effect as shown in the differential pumping section 16, and intermediate the same and the ionization chamber 18, respectively.

A collimator is indicated schematically at 31 and is disposed as shown adjacent one extremity of the beam pipe 12. The collimator 31 is operable to collimate charged particle beams incident thereon for purposes described in detail hereinbelow.

A gas inlet is indicated at 32 and is operable to admit gas(es) at precisely predetermined pressures, and thus densities, into the ionization chamber 18 for experimental purposes. Ionization collection electrodes are indicated schematically at 34 and are disposed within the chamber 18 for collection of ionization as indicated by an ionization current Ip. A Faraday cup is indicated schematically at 36 and is disposed as shown in the ionization chamber 18 only for calibration of the beam intensity monitoring apparatus of the invention as described in greater detail hereinbelow; it being readily understood by those skilled in this art that the Faraday cup 36 is operable to output as indicated a cup current $I_f$ which is proportional in magnitude to the intensity of, or absolute number of charged particles resident in, a charged particle beam incident thereon.

Charged particle beam intensity monitoring apparatus constructed and operative in accordance with the teachings of this invention are indicated generally at 40 and are disposed as shown within the beam intensity monitoring section 14 of the experimental device 10. The apparatus 40 comprise a beam intensity monitoring component 42 which is operable to pass a constant, precisely predetermined portion, only, of an incident charged particle beam while concomitantly stopping the remainder of said beam by collection of the charged particles resident therein; and which is also operable as indicated to output a monitoring current $I_m$ which is proportional in magnitude to the intensity of that charged particle beam remainder.

Current comparator means are indicated schematically at 41, and current detector means taking, for example, the form of an electronometer are indicated schematically at 43. The current comparator means 41 are operable to determine the ratio R of the Faraday cup current $I_f$ to the monitoring current $I_m$ and to output that ratio as indicated.

In operation, for precise calibration of the experimental device 10 as briefly described for introductory purposes, it may be understood that, with an appropriately configured, as by collimator 31, charged particle beam 44 from any suitable non-illustrated source thereof incident as shown upon beam monitoring component 42, and with ionization chamber 18 evacuated to a very low pressure as specified in greater detail hereinbelow, a constant predetermined portion, only, of that incident beam will be passed by component 42 in the form of charged particle beam 46 for impingement as shown upon Faraday cup 36 in ionization chamber 18; with the remainder of beam 44 being stopped by beam monitoring component 42. As a result, a cup current $I_f$ proportional in magnitude to the absolute number of charged particles resident in beam 46 upon entry thereof into ionization chamber 18 will be outputted by Faraday cup 36; while a monitoring current $I_m$ proportional in magnitude to the number of charged particles resident in, e.g., the intensity of, the remainder of the incident charged particle beam 44 as stopped by monitoring component 42 will be concomitantly outputted by monitoring apparatus 40. Under these circumstances, it should be clear that, once the cup-monitoring current ratio R is precisely determined, as by current comparator means 41, thus calibrating the experimental device 10, the Faraday cup 36 can be removed from ionization chamber 18 and the monitoring current $I_m$, per se, detected, as by current detector 43, to provide continuous and precise indication of the absolute number of charged particles entering the ionization chamber 18 attendant the conduct of experiments in the later, and irrespective of the experimental pressure in said chamber.

Figure 2:
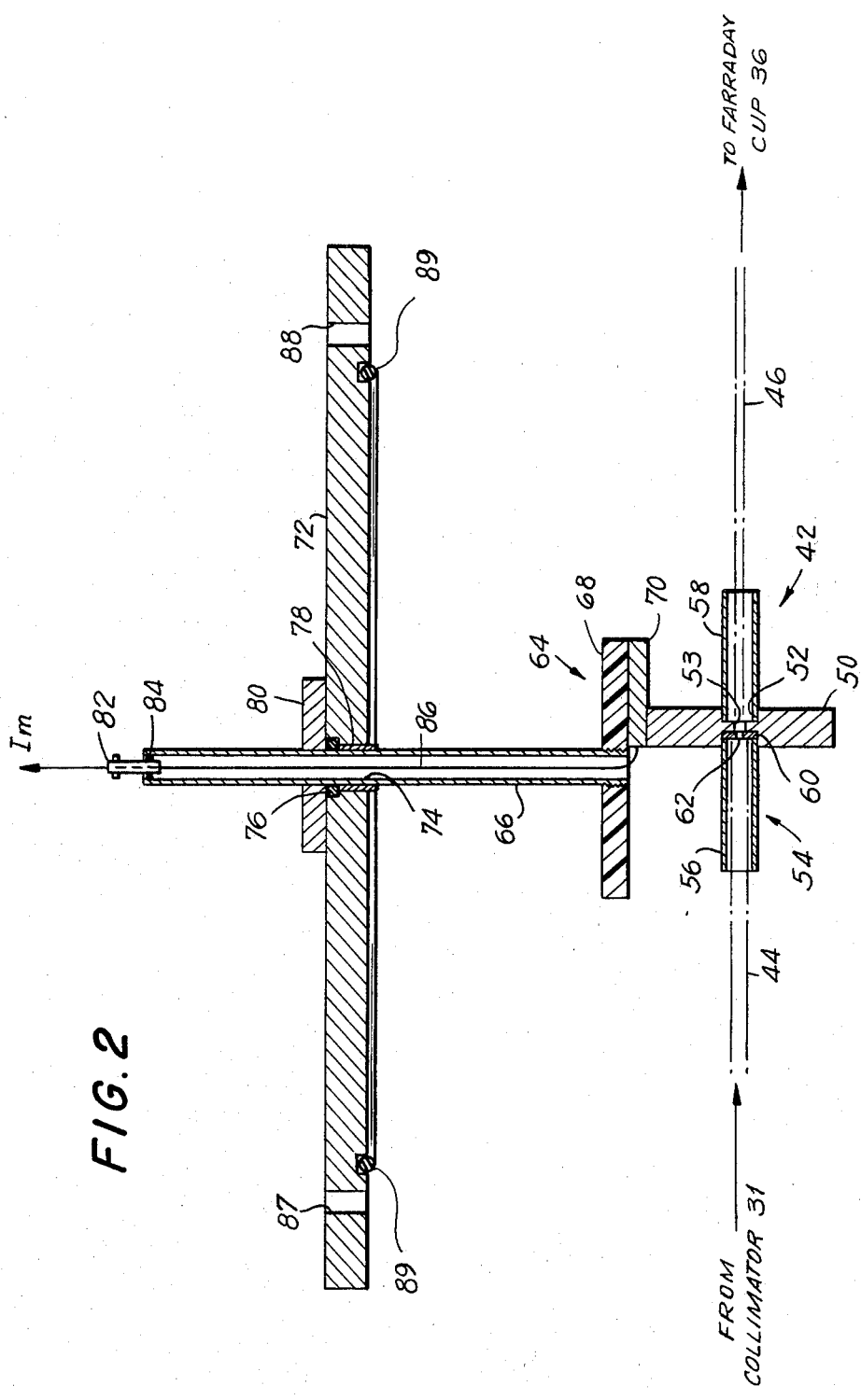
FIG. 2 is a detailed, cross-sectional view of the beam monitoring apparatus of the invention as utilized in the experimental device of FIG. 1, and taken generally vertically thereof.
Figure 3:
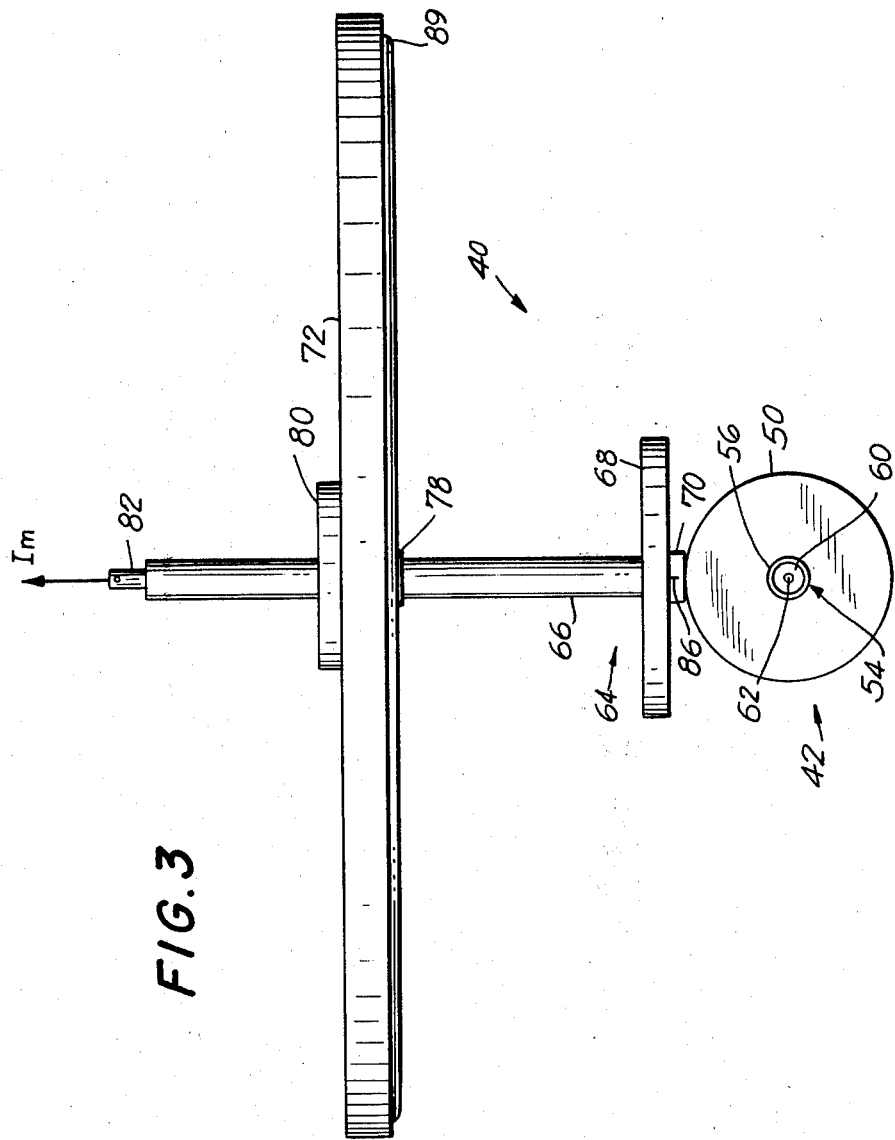
FIG. 3 is a detailed end-view of the beam monitoring apparatus of the invention taken generally in the direction of the incoming beam in FIG. 1.

Referring now also to FIGS. 2 and 3 of the drawings for more detailed description of the beam intensity monitoring component 42 of the invention, the same will be seen to comprise a mounting member preferably taking the form of a disc 50 of any appropriate, electrically conductive material as, for example, copper. A stepped mounting bore 52 having a generally central aperture 53 is formed as shown generally centrally of the disc 50; and a beam tube member 54, preferably taking the form of generally equally sized lengths of copper tubing 56 and 58 is carried as shown from the disc 50 by the suitable attachment, as by soldering, of respective tubing length extremities as shown within the stepped mounting bore 52; all to result in a structurally integral assembly with the respective axes of the tubing lengths, and the axis of the mounting bore aperture 53 all in substantial alignment, and the respective tubing lengths 56 and 58 electrically connected to the disc 50.

A beam intensity monitoring member, preferably taking the form of a foil disc of a physically appropriate material such as tantalum, is indicated at 60 and is disposed as shown in the stepped mounting bore 52 of the copper disc 50 at the relevant extremity of tubing length 56. The foil disc 60 is attached to the copper disc 50 in an appropriate manner as, for example, by the use of a suitable epoxy and the subsequent silver painting of the foil disc edges to the relevant copper disc surface in the mounting bore to insure an excellent electrical contact therebetween. A beam passage aperture 62 is formed as shown generally centrally of the foil disc 60, again in substantial alignment with the respective axes of the tubing lengths 56 and 58 and of the mounting bore aperture 53. Although, as discussed in greater detail hereinbelow, the thickness of foil 60 may vary depending upon the particular application to which the apparatus and method of the invention are put, it will be understood that such thickness should, in all instances, be sufficient to stop the most energetic charged particle resident in the beam which is incident on the foil.

Beam intensity monitoring component support means are indicated generally at 64 and comprise an elongate support member preferably taking the form of a tube 66 of any appropriately rigid and durable material in the nature, for example, of brass. An insulative support is indicated at 68 and preferably takes the form of a disc of Teflon or like electrically insulative material which will not outgas in the low pressure operational environment of the beam monitoring section 14. The disc 68 is affixed as shown to the relevant extremity of the tube 66 in any suitable manner. A conductive support is indicated at 70 and preferably takes the form of a strip of copper or like electrically conductive material which is affixed as shown to the underside of disc 68 in any suitable manner, as by an epoxy, so as to be electrically insulated from tube 66. The mounting member disc 50 is in turn affixed as shown, again in any suitable manner such as soldering to the underside of conductive support strip 70 to thus provide for electrical conductivity between the foil 60, the tubing lengths 56 and 58, the disc 50 and the support strip 70, respectively, while assuring the electrical insulation thereof from support tube 66.

A mounting plate, for example of aluminum, is indicated at 72 and comprises a stepped bore 74 through which the tube 66 extends as shown. Sliding "O" ring seal means 76 and a Teflon sleeve 78 are interposed as shown in the stepped bore 74 to provide an ultra high vacuum tight sliding seal between tube 66 and mounting plate 72; which seal is even further reinforced by a sealing plate 80 disposed thereover as shown. Under these circumstances it should be clear that vertical, as seen in all the drawing FIGS., adjustment in the disposition of the monitoring component 40 relative to the experimental device 10 may be readily accomplished without adverse effect on the integrity of the seal or, accordingly, on the ultra high vacuum tightness of the said experimental device.

A BNC connector 82 is disposed as shown at the outer extremity of support tube 66, and an "O" ring seal 84 is interposed therebetween to maintain the integrity of the ultra high vacuum tightness of the experimental device 10. In addition, the "O" ring seal 84 insures the electrical insulation of the BNC connector from the support tube. A conductor 86 extends as shown from conductive support strip 70 through tube 66 to the BNC connector 82 to thus effect the electrical connection of the foil disc 60, and the tubing lengths 56 and 58, to that connector through support disc 50 and the conductive strip 70 while assuring the electrical insulation of the thusly electrically connected components from the support tube 66.

Threaded mounting bores as indicated at 87 and 88 are formed around the periphery of the circular mounting plate 72 and correspond with like threaded mounting bores, not shown, formed in a circular mounting flange 90 provided as shown in FIG. 1 on the beam monitoring section 14 of the experimental device 10 for the ultra high vacuum tight, yet readily removable as for maintenance or adjustment, mounting of the monitoring apparatus 40 of the invention within the experimental device as described. To this effect, an "O" ring seal 89 is provided as shown on the underside of mounting plate 72.

In operation, for the precise calibration of the experimental device 10 attendant an application thereof, for example, to the precise determination of the average energy W required to produce an ion pair in nitrogen or tissue equivalent gases through use of a de-focussed (to minimize the effect of non-uniformities) beam of relatively low energy, for example, less than 5 MeV/atomic mass unit, ions from an appropriate source thereof in the nature of an accelerator, collimator 31 could be configured to provide a beam of, for example, approximately 0.030 inch in diameter for incidence upon beam monitoring component 40. For such application, the respective tubing length 56 and 58 could, for example, each be approximately 0.375 inch in diameter and 3.5 inches in length; while the tantalum foil disc 60 could also be, for example, of approximately 0.375 inch in diameter and of approximately 0.015 inch in thickness, with the beam passage aperture 62 in disc 60 being, for example, of approximately 0.005 inch in diameter. In addition, the copper disc 50 could, for example, be of approximately 1.0 inch in thickness, and comprise an aperture 53 in stepped bore 52 of, for example, approximately 0.25 inch in diameter.

Under the above circumstances with the beam monitoring component 42 and the Faraday cup 36 respectively disposed in the monitoring section 14 and ionization chamber 18 as depicted in FIG. 1 in alignment with the heavy ion beam 44 from collimator 31, and with the ionization chamber 18 as well as the monitoring section 14 and the differential pressure section 16 all evacuated for calibration purposes to a very low pressure in the range, for example, of $10^{-5}$ to $10^{-7}$ torr at monitoring component 42 and less than $2 \times 10^{-3}$ torr in ionization chamber 18, it will be understood by those skilled in this art that a constant predetermined portion, only, of the heavy ion beam 44 which enters tubing length 56 for incidence upon foil disc 60 will pass through the beam passage aperture 62 in the latter for incidence, as shown in FIG. 1, in the form of a heavy ion beam 56 upon the Faraday cup 36 in ionization chamber 18, with attendant absolute stopping of the beam 46 by the Faraday cup and outputting by the latter of the cup current $I_f$ proportional in magnitude to the number of ions resident in the beam and application of that current as shown to current comparator means 41 and current detector means 43. Concomitantly, the ions resident in the remainder of the heavy ion beam 44 from collimator 31 as is incident upon the tantalum foil disc 60, namely, that portion of beam 44 lying in an annulus of radii from 0.0025 to 0.015 inch, will be absolutely stopped by the disc 60 with attendant outputting by the latter of the monitoring current $I_m$ proportional in magnitude to the number of ions resident in that beam remainder and application thereof as shown through disc 50, strip 70, conductor 86 and BNC connector 82 to each of the comparator and detector means 41 and 43. In addition, the vast majority of all secondary electrons as may be emitted by the foil disc 60 attendant the incidence of the remainder of the hevy ion beam 44 thereon as described, and/or as may be emitted by copper disc 50 attendant the incidence of stray ions thereon, will be absorbed by the respective tubing lengths 56 and 58 which are, of course, also electrically connected as described to the BNC connector 82, and will thus contribute to the monitoring current $I_m$ with substantially no net loss of charge from the monitoring component 42; it being noted that energy loss due to secondary electron emission should be limited by the configuration of the apparatus of the invention to less than 0.1 percent.

With the respective cup current $I_f$ and monitoring current $I_m$ outputted and applied as described, it may be understood that with a known ratio R therebetween as determined by comparator means 41, the experimental device 10 can readily be precisely calibrated to provide particularly accurate determination of the absolute number of heavy ions entering the ioniztion chamber 18. This is to say that with R, the ratio of $I_f$ to $I_m$, known over a suitable incident beam intensity calibration range, precise determination of $I_f$ by determination of $I_m$, per se, is made possible.

Upon completion of calibration as above, the Faraday cup 36 is removed from the ionization chamber 18 and, for the W determination under discussion by way of example, only, the latter is then filled through experimental gas inlet 32 with research grade nitrogen or Rossi-type tissue-equivalent gas to a pressure of 1 to 5 milli torr to enable that determination.

Continuous and precise determination of the intensity or energy of the heavy ion beam 46 entering the ionization chamber 18 during the W determination, and irrespective of the experimental pressure or gas density prevailing in the experimental chamber, which pressure may, for example, be as high as atmospheric, is accordingly then provided by the thusly calibrated apparatus and method of the invention through the continuous and precise detection by electrometer 43 of the magnitude of the monitoring current $I_m$, per se, it being readily understood by those skilled in this art that the precision provided as described by the apparatus and method of the invention with regard to the determination of the intensity of beam 46 will, of course, be advantageously reflected by like precision in the determination of W as provided by the experimental device 10. Thus, for example, in the embodiment described above, if a beam intensity into the experimental chamber of about $10^{-13}$ amperes were desired for a particular W determination, it may be understood that adjustment, if necessary, in the intensity of the de-focussed charged particle beam from the non-illustrated accelerator to provide a monitoring current $I_m$ of about $3 \times 10^{-12}$ amperes, as determined by electrometer 43, could be effective to that end.

With more specific regard to the beam intensity monitoring precision provided by the apparatus and method of the invention, it may be understood that the same have proven capable of consistently determining the intensity of the charged particles beam upon entry thereof into the experimental chamber or other situs of beam incidence with a statistical uncertainty of only about 0.6 percent. In addition, continuous charged particle beam intensity monitoring for particularly long periods of time ranging, for example, up to twelve hours, have been provided by the apparatus and method of the invention without loss in beam monitoring precision. Too, and as believed made clear by this specification, no loss of energy in that portion of the incident charged particle beam 44 which passes through the beam monitoring means 40 of the invention for entry into experimental chamber 18 in the form of charged particle beam 46 (FIGS. 1 and 2), occurs; and this would, of course, be of particular advantage for applications as described with charged particle beams taking the form of relatively low energy heavy ions.

Although described hereinabove by way of example as utilizable in conjunction with the monitoring of a low energy heavy ion beam from an accelerator, it is to be clearly understood that the apparatus and method of the invention are by no means limited thereto, but rather, are applicable as well to the monitoring of the intensities of a wide variety of charged particle beams including ions, electrons, protons, alpha particles and the like, of a wide range of energies, and from a wide range of beam sources including, but by no means limited to, radioactive materials. Too, although described hereinabove by way of example as utilizable in conjunction with an experimental device for the determination of W, it is to be clearly understood that the apparatus and method of the invention are by no means limited thereto, but rather, are applicable as well to the monitoring of the intensities of charged particle beams in a wide variety of other and different experiments including, but not limited to, the determination of radial dose and LET (linear energy transfer), and to a wide variety of other and different nonexperimental as well as experimental applications including, but not limited to, electron microscopy, X-ray technology, Auger electron spectroscopy, electron spectroscopy as used for chemical analyses (ESCA), charged particle beam sputtering (cleaning), secondary ion mass spectroscopy, ion scattering spectroscopy, and radiation therapy. Of course, the fact that the precision of operation of the apparatus and method of the invention is not adversely affected by the pressure in the ionization chamber, provided the pressure in the different pumping sections is maintained below 0.1 milliTorr, or other situs of incidence of the charged particle beam once calibration has been completed, would ideally suit the apparatus and method to monitoring use attendant radiation therapy wherein such situs (the patient) is at atmospheric pressure. In addition, and although representative dimensions for various of the components of the apparatus of the invention are provided hereinabove to insure a complete disclosure, it will be understood that such dimensions are representative, only, and can vary in accordance with the particular requirements of other and different applications of the invention apparatus. Thus, for example, utilization of the invention apparatus and method with charged particle beams of significantly higher intensities than those discussed would most probably dictate use of foil disc and tubing length components of increased dimension.

By all of the above it is believed made clear that the apparatus and method of the invention will function, in full accordance with the stated objects thereof, to provide for long periods of particularly precise monitoring of the intensities of a wide variety of charged particle beams of a wide variety of beam energies and attendant a wide variety of charged particle beam applications, all substantially without energy loss in the charged particle beam being monitored.

The embodiment disclosed herein was chosen and described to best explain the teachings of the invention and its practical application to thereby enable others skilled in the art to best utilize the apparatus and method of the invention in various embodiments and with various modifications as are suited to the particular use contemplated. It is intended that the scope of the invention be defined by the claims appended hereto.

What is claimed is:

1. Apparatus comprising means for monitoring the intensity of charged particle beams, said beam intensity monitoring means being disposable in the path of such a charged particle beam, said beam monitoring means including means for preventing the passage of a constant cross-sectional portion of such charged particle beam through said beam monitoring means and for concomitantly permitting the passage of the remaining cross-sectional portion of the charged particle beam through said beam monitoring means without change, said beam monitoring means also including means for providing a signal which is indicative of the intensity of the charged particle beam cross-sectional portion which is prevented from passing therethrough; whereby, the provision of a signal indicative of the intensity of the charged particle beam cross-sectional portion which is permitted to pass through said beam monitoring means and the determination of the ratio of that signal to said signal provided by said beam monitoring means over a predetermined range of charged particle beam intensities will enable the subsequent determination of the intensity of said charged particle beam cross-sectional portion which is permitted to pass through said beam monitoring means by determination of said beam monitoring means signal.

2. An apparatus as in claim 1, wherein said means to prevent the passage of a beam portion comprises a member of a material through which said beam cannot pass.

3. An apparatus as in claim 2, wherein an aperture is formed in said member.

4. An apparatus as in claim 2, wherein said means is operable to output a current proportional in magnitude to the intensity of the beam portion incident on said member.

5. An apparatus as in claim 3, wherein said member is generally planar and is disposed generally perpendicularly of said charged particle beam.

6. An apparatus as in claim 3, wherein said member is a disc and said aperture is formed generally centrally thereof.

7. An apparatus as in claim 3, wherein said material is a foil material.

8. An apparatus as in claim 5, further comprising tubes extending to both sides of said member and generally perpendicularly thereof with the longitudinal axis of said tubes being in substantial alignment with the longitudinal axis of said aperture.

9. An apparatus as in claim 7, wherein said material is tantalum.

10. An apparatus as in claim 8, wherein the inside diameter of said tubes is substantially greater than the diameter of said aperture.

11. An apparatus as in claim 1, further comprising, calibration means disposable in the path of the beam portion which passes through said beam monitoring means, said calibration means being operable to provide a signal indicative of the intensity of said beam portion.

12. An apparatus as in claim 11, further comprising, means to determine the ratio between said signals.

13. An apparatus as in claim 11, wherein said calibration means comprises a Faraday cup.

14. A method for monitoring the intensities of charged particle beams comprising the steps of, preventing the passage of a cross-sectional portion of a charged particle beam through beam intensity monitoring means, concomitantly permitting the passage of another cross-sectional portion of such charged particle beam through said beam intensity monitoring means, and concomitantly providing a signal indicative of the intensity of said charged particle beam cross-sectional portion which is prevented from passing through said beam intensity monitoring means whereby, the provision of a signal indicative of the intensity of said charged particle beam cross-sectional portion which is permitted to pass through said beam monitoring means and the determination of the ratio of that signal to the signal provided by said beam monitoring means over a predetermined range of charged particle beam intensities will enable the subsequent determination of the intensity of the charged particle beam cross-sectional portion which is permitted to pass through the beam intensity monitoring means by determination of said beam intensity monitoring means signal.

15. In a method as in claim 14, wherein the step of preventing the passage of said beam portion comprises, the step of disposing a part of said beam monitoring means through which said beam portion cannot pass in the path thereof.

16. In a method as in claim 14, wherein the step of permitting passage of said another beam portion comprises the step of disposing an aperture in said beam monitoring means in the path thereof.

17. In a method as in claim 14, further comprising the step of, disposing calibration means which are operable to provide a signal indicative of the intensity of a charged particle beam which is incident thereon in the path of said another beam portion to provide a signal indicative of the intensity thereof.

18. In a method as in claim 17, further comprising the step of, determining the ratio between said signals.

* * * * *